United States Patent
Sagisaka

(10) Patent No.: US 9,225,567 B2
(45) Date of Patent: Dec. 29, 2015

(54) RECEIVING APPARATUS AND DEMODULATION METHOD

(71) Applicant: Panasonic Corporation, Osaka (JP)

(72) Inventor: Masahiko Sagisaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/623,322

(22) Filed: Feb. 16, 2015

(65) Prior Publication Data

US 2015/0244552 A1    Aug. 27, 2015

(30) Foreign Application Priority Data

Feb. 25, 2014   (JP) .................................. 2014-033938

(51) Int. Cl.
*H03D 3/00*    (2006.01)
*H04L 27/144*    (2006.01)

(52) U.S. Cl.
CPC .................................... *H04L 27/144* (2013.01)

(58) Field of Classification Search
CPC ..................................................... H04B 14/004
USPC ........................................................... 375/335
See application file for complete search history.

(56) References Cited

U.S. PATENT DOCUMENTS 5,367,539 A * 11/1994 Copley .......................... 375/347
5,995,553 A * 11/1999 Crandall et al. ............... 375/272

FOREIGN PATENT DOCUMENTS

JP          9-130300          5/1997

* cited by examiner

*Primary Examiner* — Lihong Yu
(74) *Attorney, Agent, or Firm* — Seed IP Law Group PLLC

(57) ABSTRACT

A receiver simultaneously receives a plurality of signals on a plurality of channels, which have been modulated using frequency shift keying (FSK). A calculation range controller detects a Mark frequency and a Space frequency for each channel, determines for each channel a frequency range for Fourier transform calculation of the plurality of receiving signals, based on the detected Mark frequency and the detected Space frequency and indicates the frequency range to a frequency component detector. The frequency component detector performs Fourier transformation on the determined frequency range for each channel and detects, for each channel, frequency components (FFT signals) of the plurality of receiving signals respectively. The channel shifter allocates the FFT signals output from the frequency component detector to data of channel 1 to channel N and outputs the signals to respective demodulators.

4 Claims, 7 Drawing Sheets

1

RECEIVING APPARATUS AND DEMODULATION METHOD

CROSS REFERENCES TO RELATED APPLICATIONS

This application claims priority to Japanese Patent Application No. 2014-033938 filed on Feb. 25, 2014, the contents of which are hereby incorporated by reference.

BACKGROUND

1. Technical Field

This disclosure relates to a receiving apparatus and a demodulation method for receiving and demodulating a frequency shift keying (FSK) modulated signal.

2. Description of the Related Art

As one of the modulation methods for digital communication, a frequency shift keying (FSK) modulation method is known where the values of digital signals, "0" and "1", are assigned to different frequencies, whereby digital signals are modulated. An example of a demodulation method for FSK modulated signals is described in Japanese Unexamined Patent Application Publication No. 9-130300.

FIG. 1 is a block diagram illustrating a receiving apparatus (specifically, a multi-frequency shift keying demodulator) described in Japanese Unexamined Patent Application Publication No. 9-130300. The receiving apparatus in FIG. 1 includes an antenna 1, a first demodulator 2 employing a frequency hopping spread spectrum method, and a second demodulator (MFSK demodulator) 3 employing a MFSK method. The first demodulator 2 includes a mixer 5, a frequency synthesizer 6, and a hopping pattern generator 7. The second demodulator 3 includes a band pass filter (BPF) 8, an analog-digital (AD) converter 9, a fast Fourier transformer (FFT) 10, a maximum value selector 11, and a decoder circuit 12.

The mixer 5 generates a first decode signal by synchronizing and mixing a spread spectrum signal which is received by the antenna 1 and amplified by an amplifier (not illustrated) and a hopping local signal provided by the frequency synthesizer 6 and performing an inverse spread spectrum process on the spread spectrum signal. The BPF 8 removes an unnecessary signal from the first decode signal output from the mixer 5. The AD converter 9 converts the first decode signal output from the BPF 8, which is an analog signal, into a digital signal.

The FFT 10 truncates the digital signal output from the AD converter 9 by a predetermined time window and performs fast Fourier transform to simultaneously detect a plurality of frequency components (FFT signals) in the digital signal.

The maximum value selector 11 detects a change in a frequency component representing plural maximum amplitude values in the FFT signal output from the FFT 10, and generates a code word data signal S1 having plural code word chips as a received signal, according to the change of frequency component. Further, the maximum value selector 11 performs maximum likelihood detection between the code word data signal S1 and a plurality of code word pattern data signals S2 that are set in advance in accordance with bit patterns of the second demodulation data, and thereby selects the code word pattern data signal S2 which has the highest matching degree with the code word data signal.

The decoder circuit 12 decodes the code word pattern data signal selected by the maximum value selector 11 into a digital signal having the predetermined number of bits, and outputs the signal as the second demodulation data signal (demodulation data).

As described above, in the multi-frequency shift keying demodulator according to Japanese Unexamined Patent Application Publication No. 9-130300, fast Fourier transform is performed on the FSK modulated signal to detect a plurality of frequency components included in the modulated signal, and a data signal is obtained using the plural frequency components. The technique described in Japanese Unexamined Patent Application Publication No. 9-130300 does not use an envelope detector or require a plurality of band pass filters. Therefore, demodulation can be performed accurately at a high speed without variations in characteristics.

However, in the above conventional technique, Fourier transform calculation is performed for each frequency component; therefore, a large amount of calculation is required. In particular, in a case where a plurality of signals on plural channels are simultaneously received, the number of demodulation blocks needs to be the same as the number of channels, which leads to a significant increase in circuit size and power consumption.

SUMMARY

One non-restricting and exemplary embodiment provides a receiving apparatus in which the circuit size and power consumption are reduced even when a plurality of signals on plural channels are simultaneously received.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature a receiving apparatus that includes a receiver that simultaneously receives a plurality of signals on a plurality of channels, which have been modulated using frequency shift keying (FSK); a calculation range controller that detects a Mark frequency and a Space frequency for each channel, controls and determines for each channel a frequency range for Fourier transformation calculation of the plurality of receiving signals, based on the detected Mark frequency and the detected Space frequency; a frequency component detector that performs the Fourier transformation calculation on the determined frequency range for each channel and detects, for each channel, frequency components of the plurality of receiving signals respectively; a channel shifter that shifts for each channel a central frequency of the detected frequency components to a predetermined reference frequency; and a demodulator that demodulates the shifted frequency components of each channel and extracts demodulation data for each channel.

In another general aspect, the techniques disclosed here feature a demodulation method of a plurality of signals on plurality of channels, which have been modulated using frequency shift keying (FSK) includes detecting a Mark frequency and a Space frequency for each channel, determining for each channel a frequency range for Fourier transformation calculation of an FSK modulated digital signal, based on the detected Mark frequency and the detected Space frequency; performing the Fourier transformation calculation on the determined frequency range for each channel and detecting frequency components of each channel in the FSK modulated digital signal; shifting for each channel a central frequency of the detected frequency components to a predetermined reference frequency; and demodulating the shifted frequency components of each channel and extracting demodulation data for each channel.

These general and specific aspects may be implemented using a system, a method, and a computer program, and any combination of systems, methods, and computer programs.

According to this disclosure, when performing a frequency detection process, a frequency range can be controlled so that certain frequency components needed to achieve desirable demodulation accuracy are used. Therefore, the amount of calculation in the frequency component detector and in the demodulator can be reduced. Thus, in a receiving apparatus, the circuit size and power consumption for simultaneously receiving a signal on plural channels can be reduced.

DETAILED DESCRIPTION

Hereinafter, an Embodiment of this disclosure will be described in detail with reference to the drawings. Note that in the following description, binary FSK modulation is employed as FSK modulation.

(Embodiment)

Figure 1:
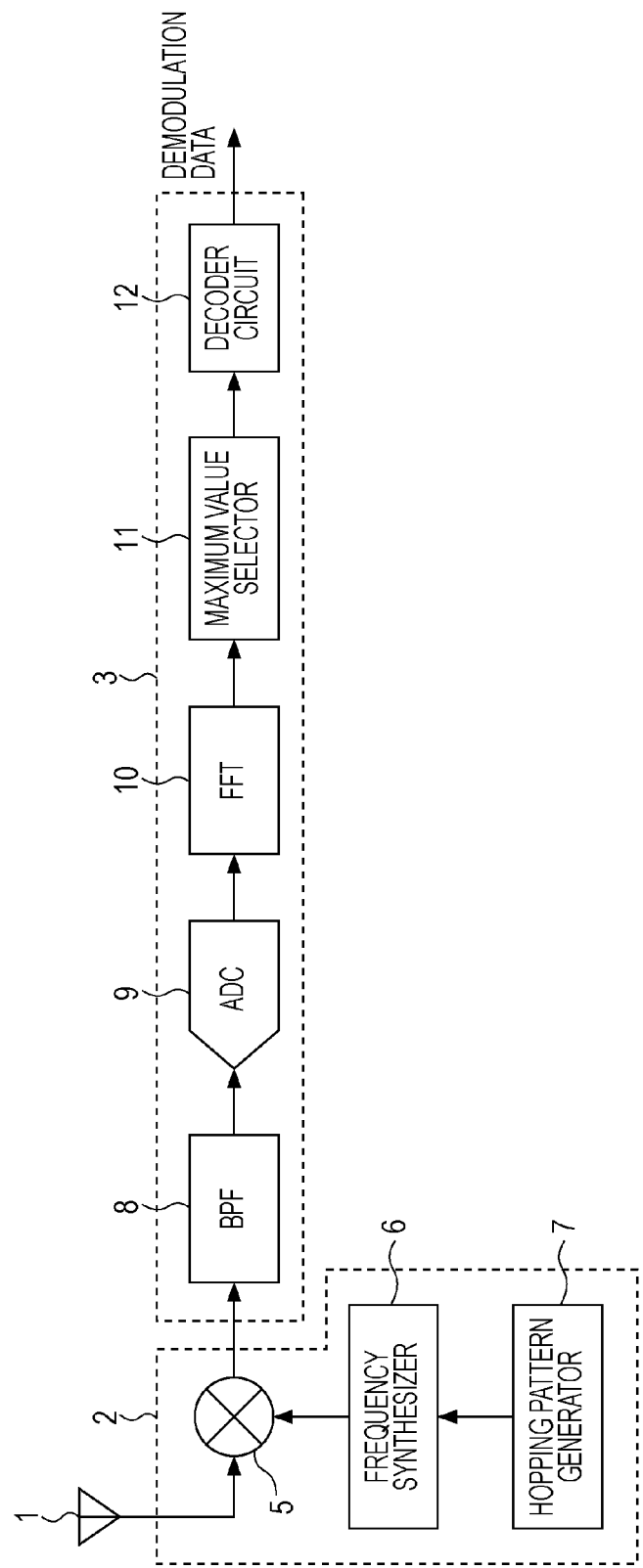
FIG. 1 is a block diagram illustrating a conventional receiving apparatus.
Figure 2:
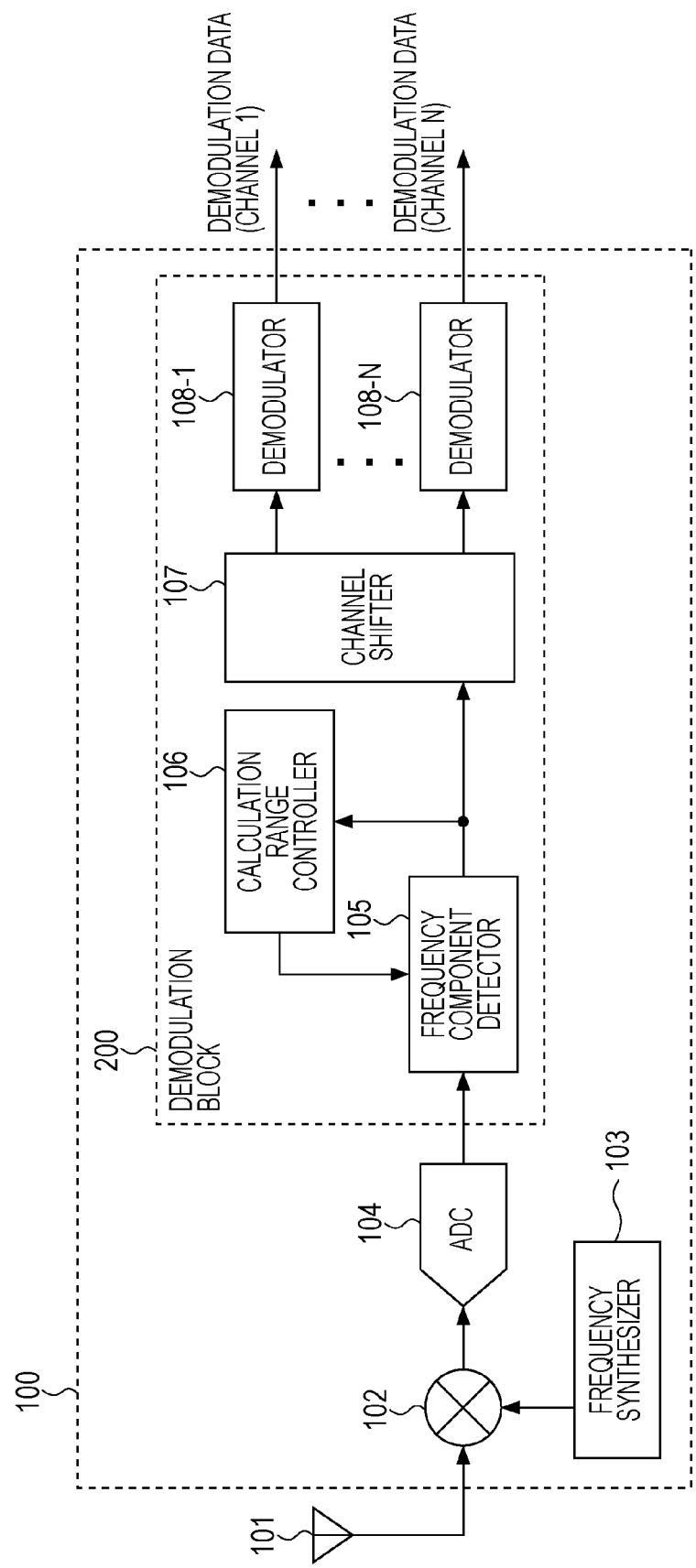
FIG. 2 is a block diagram illustrating a configuration of a receiving apparatus according to an embodiment of this disclosure.

FIG. 2 is a block diagram illustrating a configuration of a receiving apparatus according to an embodiment of this disclosure. As illustrated in FIG. 2, a receiving apparatus 100 includes an antenna 101, a mixer 102, a frequency synthesizer 103, an analog-digital converter (ADC) 104, and a demodulation block 200 as main components. The demodulation block 200 includes a frequency component detector 105, a calculation range controller 106, a channel shifter 107, and N (N is larger than 1) demodulators 108. Note that the receiving apparatus 100 receives a plurality of signals on plurality of channels simultaneously.

The mixer 102 mixes a high-frequency received signal which is received by the antenna 101 and amplified by an amplifier (not illustrated), and a local signal input from the frequency synthesizer 103 to generate an intermediate-frequency analog signal. The mixer 102 then outputs the intermediate-frequency analog signal to the ADC 104.

The ADC 104 converts the analog signal output from the mixer 102 into a digital signal. The ADC 104 outputs the digital signal to the frequency component detector 105.

The frequency component detector 105 includes a Fourier transform calculator. The frequency component detector 105 performs fast Fourier transform on the digital signal output from the ADC 104 within a range indicated by the calculation range controller 106 to detect a frequency component (FFT signal) of each channel in the digital signal. The frequency component detector 105 outputs the FFT signal to the calculation range controller 106 and the channel shifter 107. Note that details of the frequency component detector 105 will be described later.

The calculation range controller 106 uses the FFT signal output from the frequency component detector 105 and determines a frequency range in which Fourier transform calculation is performed. The calculation range controller 106 indicates the range to the frequency component detector 105. Note that details of the calculation range controller 106 will be described later.

The channel shifter 107 divides the FFT signal output from the frequency component detector 105 by the channel and shifts the FFT signal of each channel in a manner such that the central frequency thereof is set to a predetermined reference frequency. The channel shifter 107 outputs the signals to the respective demodulators 108. Note that details of the channel shifter 107 will be described later.

Each of the demodulators 108 demodulates the FFT signal of the respective channel output from the channel shifter 107 into a digital signal that has a predetermined number of bits. The demodulator 108 outputs the digital signal as a second demodulation data signal (demodulation data). Note that details of the demodulator 108 will be described later.

Figure 3A:
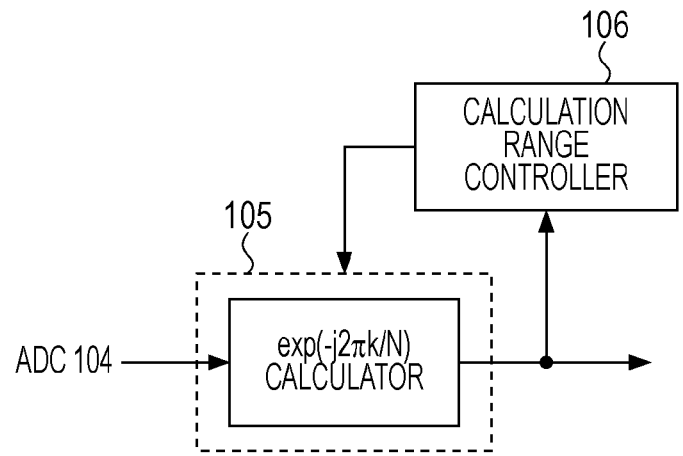
FIGS. 3A and 3B are block diagrams each illustrating a configuration of a frequency component detector according to an embodiment of this disclosure.
Figure 3B:
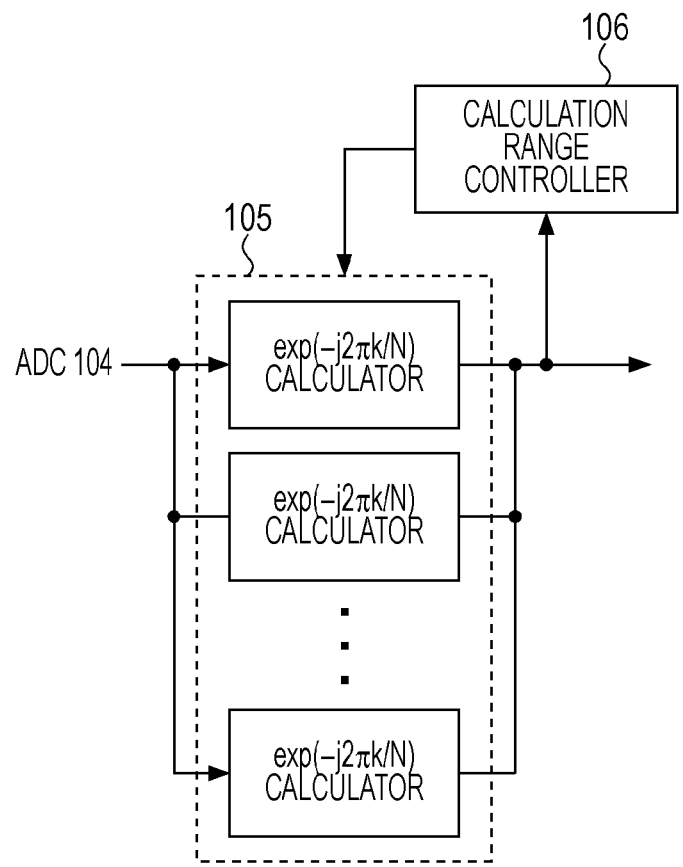

Then, an internal structure of the frequency component detector 105 will be described with reference to FIGS. 3A and 3B. There are two possible internal structures for the frequency component detector 105, which are illustrated in FIGS. 3A and 3B. FIG. 3A illustrates a case where a single calculator is used. FIG. 3B illustrates a case where a plurality of calculators are used to perform parallel operation.

In this embodiment, discrete Fourier transformation (DFT) is employed as Fourier transformation. In the DFT, the digital signal is truncated by a predetermined time window and Fourier transformation is performed to extract a plurality of frequency components of the digital signal. In general, in DFT, operation is performed as expressed by the following formula (1), where $X_q$ represents a q-th signal of a series of signals input to the calculator, $S_k$ represents a frequency component of the frequency k obtained via the Fourier transformation, q=0 to N−1, and k=0 to N−1.

$$S_k = \sum_{q=0}^{N-1} x_q \exp\left(\frac{-j2\pi qk}{N}\right) \quad (1)$$

This formula (1) means that each of the signals from $X_0$ to $X_{N-1}$ is multiplied by exp(−j2πqk/N) and they are added to calculate $S_k$, and such a calculation is repeated N times as k changes. Therefore, when k is a small number, the amount of calculation in Fourier transformation can be reduced.

In the case illustrated in FIG. 3A, a single calculator repeats the calculation for q (0 to N−1) and k (0 to N−1). In this way, the circuit size can be made smaller than that in the case illustrated in FIG. 3B. In addition, in the case illustrated in FIG. 3A, when k in the calculation can be reduced, the time required for the calculation can be made smaller than the time required for the calculation in conventional techniques.

In the case illustrated in FIG. 3B, calculators corresponding to k repeat the calculation for q (0 to N−1). In this way, the time required for the calculation can be made smaller than the time required in the case illustrated in FIG. 3A. In addition, in the case illustrated in FIG. 3B, when k in the calculation can be reduced, the circuit size can be made smaller than that in the calculation in conventional techniques.

In this embodiment, in both cases of FIG. 3A and FIG. 3B, the frequency component detector 105 performs Fourier transformation based on the value of k indicated by the calculation range controller 106. Note that instead of Fourier transformation on every frequency component, Fourier transformation on the frequency components corresponding to the value of k can achieve sufficiently high demodulation accuracy. This is because the demodulation needs data signals which are FSK modulated and have a Mark frequency and a Space frequency; therefore, the frequency components without the Mark and Space frequencies are regarded as a noise component, which is not necessary for demodulation. As described above, in this embodiment, Fourier transform calculation is performed on some frequency components including the Mark and Space frequencies, whereby the amount of Fourier transform calculation can be reduced.

Figure 4:
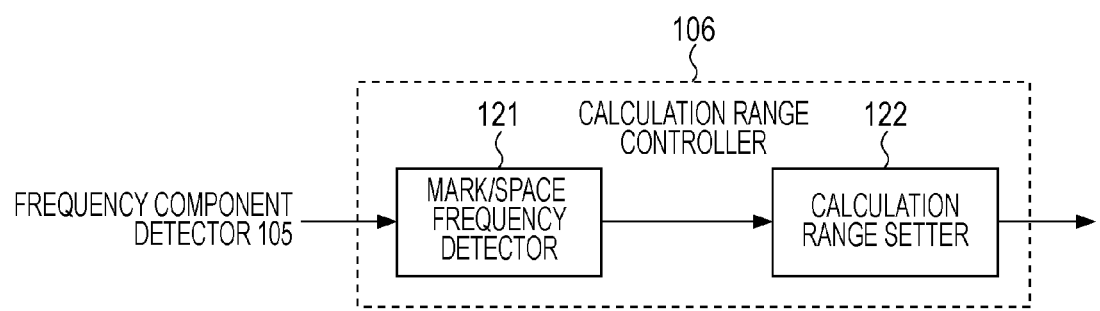
FIG. 4 is a block diagram illustrating a configuration of a calculation range controller in a receiving apparatus according to an embodiment of this disclosure.

Then, an internal structure of the calculation range controller 106 will be described with reference to FIG. 4. The calculation range controller 106 includes a Mark/Space frequency detector 121, and a calculation range setter 122.

In FSK modulation, the status of each data signal (in a case of a digital signal, 0 or 1) is assigned to different frequencies. Specifically, when the central frequency (direct current component) of a carrier wave is $S_0$, the digital signal "1" is assigned to the frequency of $S_0+\Delta S$, whereas the digital signal "0" is assigned to the frequency of $S_0-\Delta S$. The frequency of $S_0+\Delta S$ is referred to as a Mark frequency, whereas the frequency of $S_0-\Delta S$ is referred to as a Space frequency.

Figure 5:
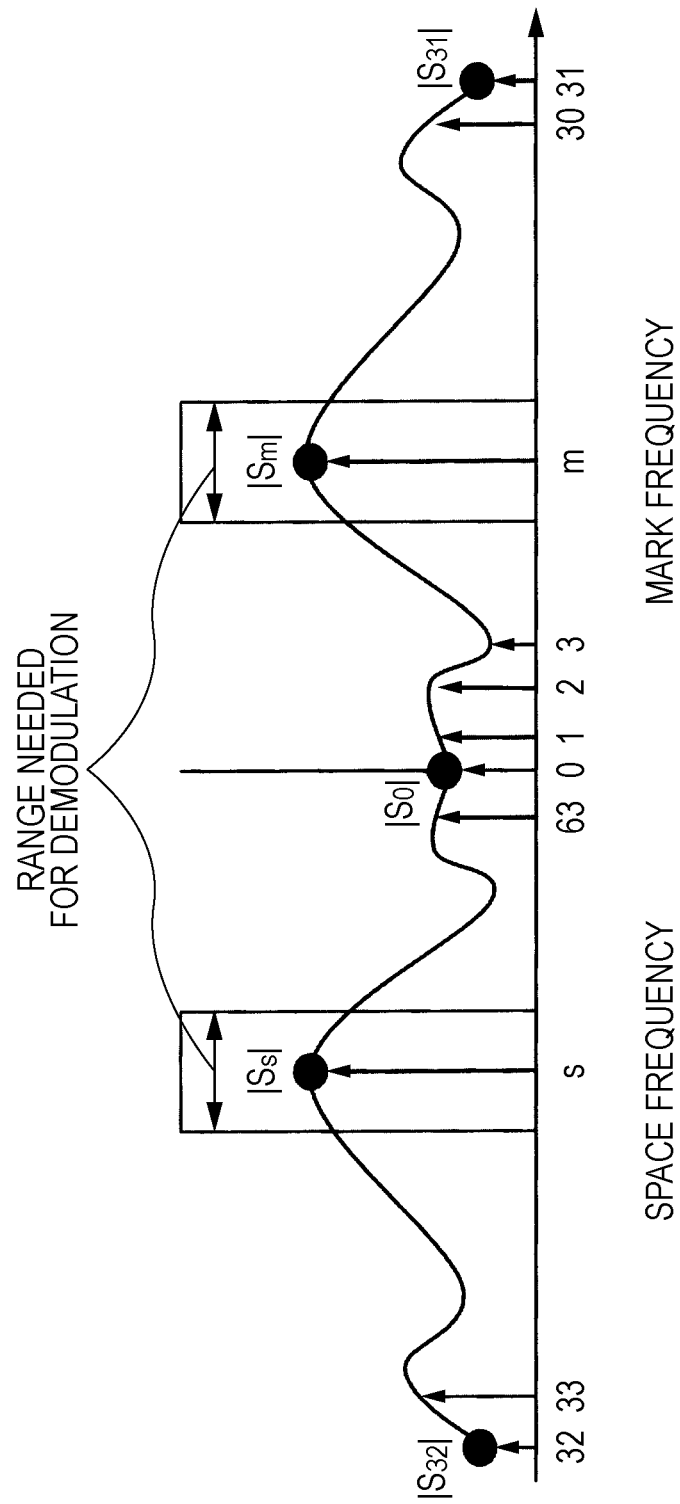
FIG. 5 illustrates a frequency spectrum of an FSK modulated signal according to an embodiment of this disclosure.

FIG. 5 illustrates a frequency spectrum of an FSK modulated signal. In FIG. 5, the horizontal axis represents the frequency and the vertical axis represents the reception level. Note that FIG. 5 illustrates an example where N is 64. As illustrated in FIG. 5, the frequency spectrum of the frequency components $S_k$ output from the frequency component detector 105 is substantially symmetrical about the central frequency (direct current component) $S_0$ of the carrier wave. Among the positive frequency components ($S_1$ to $S_{31}$), the reception level peaks at the Mark frequency $S_m$, whereas among the negative frequency components ($S_{32}$ to $S_{63}$), the reception level peaks at the Space frequency S.

The Mark/Space frequency detector 121 detects the peak value of the reception level among the positive frequency components, and detects the frequency having the peak value as the Mark frequency. Similarly, the Mark/Space frequency detector 121 detects the peak value of the reception level among the negative frequency components, and detects the frequency having the peak value as the Space frequency. Then, the Mark/Space frequency detector 121 outputs data indicating the detected Mark and Space frequencies to the calculation range setter 122.

The calculation range setter 122 sets a range including the Mark frequency and Space frequency as the frequency range on which Fourier transform calculation is performed. The calculation range setter 122 then outputs a control signal expressing k which represents the set range to the frequency component detector 105.

When the calculation range setter 122 sets the range, for example, the following methods can be employed: (1) a method in which a range from minus α to plus α (α is a predetermined fixed value) of the Mark frequency and the Space frequency is employed; (2) a method in which a range of frequencies having a certain proportion relative to the reception level of the Mark frequency or the Space frequency is employed; and (3) a method in which a width of the range is determined in accordance with the gap between the Mark frequency and the Space frequency. As an example of the third case, when the gap between the Mark frequency and the Space frequency is 100 kHz, the range is set to be within minus 10% to plus 10% of the Mark frequency and the Space frequency, and when the gap between the Mark frequency and the Space frequency is 200 kHz, the range is set to be within minus 15% to plus 15% of the Mark frequency and the Space frequency, for example.

Note that when the Mark frequency and the Space frequency are detected, a transmission rate can be calculated by the following formula (2) and the demodulation mode can be deduced. Note that in the formula (2), Rate represents the transmission rate, Mark represents the Mark frequency, and Space represents the Space frequency.

$$\text{Rate} = \frac{\text{Mark} - \text{Space}}{2} \quad (2)$$

For example, there is a system in which any one of three demodulation modes A, B, and C may be set, and the transmission rate of the demodulation mode A is 20 kbps, the transmission rate of the demodulation mode B is 50 kbps, and the transmission rate of the demodulation mode C is 100 kbps.

In this case, when the formula Mark-Space=40 kHz is satisfied, the transmission rate is calculated to be 20 kbps; therefore, the receiving apparatus can deduce that the demodulation mode A is employed. Similarly, when the formula Mark-Space=100 kHz is satisfied, the transmission rate is calculated to be 50 kbps, and the receiving apparatus can deduce that the demodulation mode B is employed. Further, when the formula Mark-Space=200 kHz is satisfied, the transmission rate is calculated to be 100 kbps, and the receiving apparatus can deduce that the demodulation mode C is employed.

In the above manner, the receiving apparatus 100 does not need to receive data indicating the demodulation mode from a sending device of a correspondence in advance, which can improve the transmission efficiency.

Figure 6:
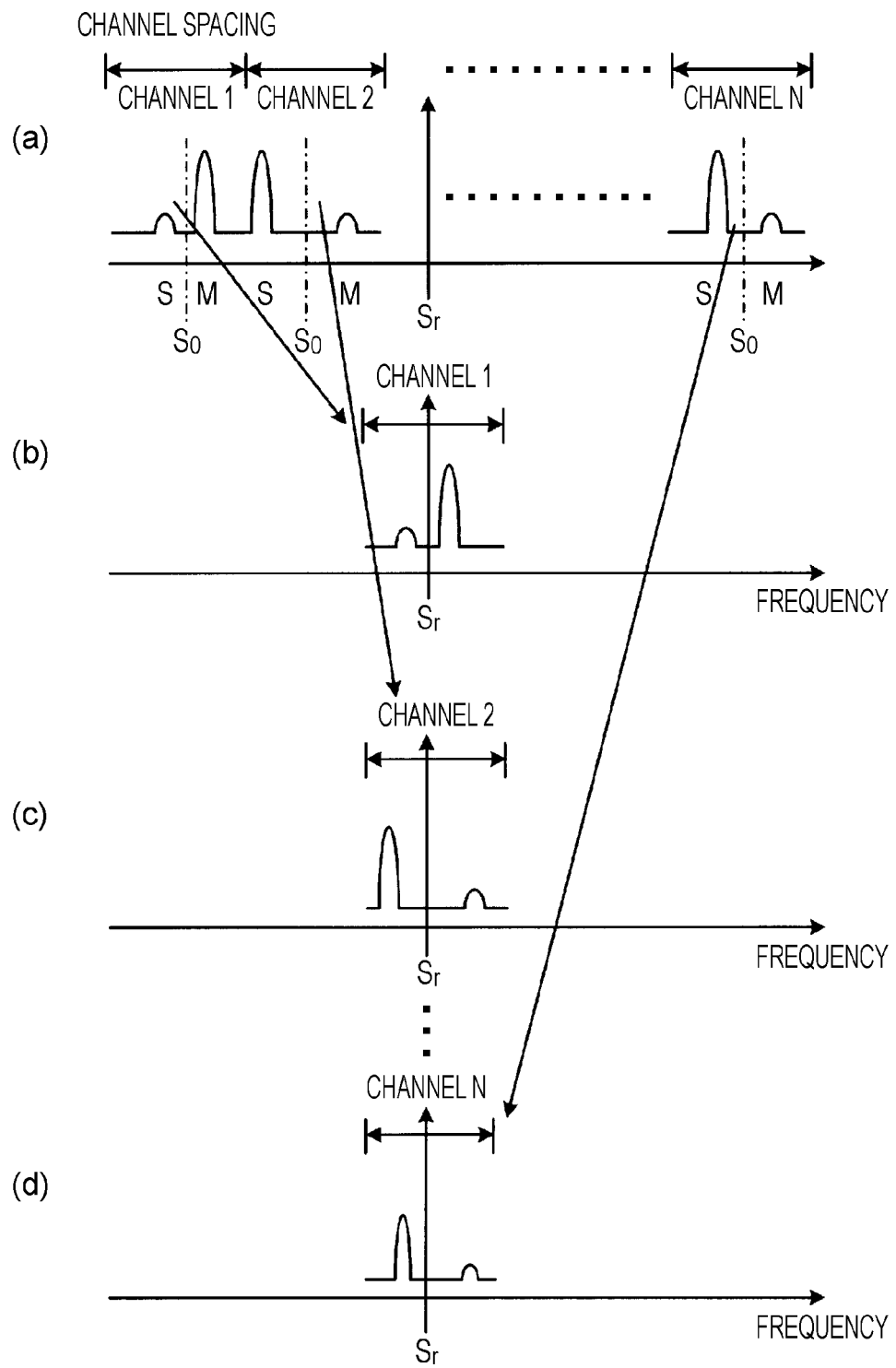
FIG. 6 illustrates an example of a channel shifter according to an embodiment of this disclosure.

Then, an operation of the channel shifter 107 will be described with reference to FIG. 6. In FIGS. 6, the horizontal axis represents the frequency and the vertical axis represents the reception level. FIG. 6(*a*) represents a frequency spectrum of the FFT signal output from the frequency component detector 105. As illustrated in FIG. 6(*a*), the FFT signal output from the frequency component detector 105 is a signal in which FFT signals of respective channels from channel 1 to channel N are consequently aligned in the frequency direction. The FFT signal of each channel includes a Mark frequency (indicated as M in FIG. 6(*a*)) and a Space frequency (indicated as S in FIG. 6(*a*)).

The channel shifter 107, at first, divides the FFT signal which is output from the frequency component detector 105 and includes the FFT signals of respective channels, according to a predetermined channel width. Thus, the FFT signal is divided into the FFT signals corresponding to respective channel 1 to channel N and these FFT signals are taken out (N is positive natural number).

Then, as illustrated in FIGS. 6(*b*), 6(*c*), and 6(*d*), the channel shifter 107 shifts the FFT signal of each channel in a manner such that the central frequency $S_0$ is set to a predetermined reference frequency $S_r$. The channel shifter 107 outputs the shifted FFT signals to the respective demodulators 108.

Figure 7:
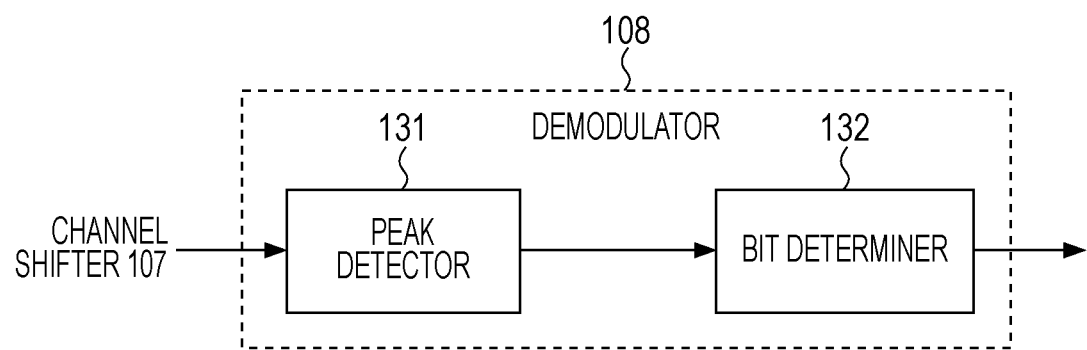
FIG. 7 is a block diagram illustrating a configuration of a demodulator in a receiving apparatus according to an embodiment of this disclosure.

Next, an internal structure of the demodulators 108 will be described with reference to FIG. 7. Each demodulator 108 includes a peak detector 131 and a bit determiner 132.

The peak detector 131 detects the peak value in the reception level of the FFT signal of the corresponding channel, which is output from the channel shifter 107. The peak detector 131 then outputs data indicating the frequency of the peak value (hereinafter, referred to as a peak frequency) to the bit determiner 132.

The bit determiner 132 determines a bit of each symbol according to the frequency data output from the peak detector 131, decodes the signal to a digital signal having a predetermined number of bits, then outputs the digital signal as a second demodulation data signal (demodulation data).

As described above, according to this embodiment, the Mark and Space frequencies in the FFT signal are detected, and Fourier transform calculation is performed on certain frequency components including the Mark and Space frequencies; therefore, the amount of Fourier transform calculation can be reduced.

Thus, according to this disclosure, the amount of calculation in the frequency component detector and in the demodulator can be reduced, which can lead to a reduction in circuit size and power consumption in the receiving apparatus. In particular, when a plurality of signals on plurality of channels are received simultaneously and a plurality of demodulators perform calculation, a marked effect due to a reduction in circuit size and power consumption can be achieved.

Note that although in the embodiment described thus far, DFT, which is the simplest calculation method for extracting a frequency component is used, this disclosure is not limited thereto. Another calculation method such as fast Fourier transform (FFT) or short-time DFT (ST-DFT) may be employed.

Further, in the embodiment described thus far, the frequency range is set based on the output signal of the frequency component detector 105; however, this disclosure is not limited thereto. Another method may be used, for example, the frequency range may be set based on modulation data which is prepared in advance.

According to this disclosure, a reduction in circuit size and power consumption can be realized while having an advantage of high-speed operation. Therefore, this disclosure can be preferably applied in the field of low-power radio transmission such as in sensor wireless networks.

What is claimed is:

1. A receiving apparatus comprising:
    a receiver that simultaneously receives a plurality of signals on a plurality of channels, which have been modulated using frequency shift keying (FSK);
    a calculation range controller that detects a Mark frequency and a Space frequency for each channel, controls and determines for each channel a frequency range for Fourier transformation calculation of the plurality of receiving signals, based on the detected Mark frequency and the detected Space frequency;
    a frequency component detector that performs the Fourier transformation calculation on the determined frequency range for each channel and detects, for each channel, frequency components of the plurality of receiving signals respectively;
    a channel shifter that shifts for each channel a central frequency of the detected frequency components to a predetermined reference frequency; and
    a demodulator that demodulates the shifted frequency components of each channel and extracts demodulation data for each channel,
    wherein the calculation range controller detects a frequency that has a peak value in a reception level among positive frequency components of the plurality of receiving signals as the Mark frequency and another frequency that has a peak value in the reception level among negative frequency components of the plurality of receiving signals as the Space frequency.

2. The receiving apparatus according to claim 1,
    wherein the calculation range controller estimates a demodulation mode for each channel based on the detected Mark frequency and the detected Space frequency.

3. A demodulation method comprising:
    receiving a plurality of signals on a plurality of channels, which have been modulated using frequency shift keying (FSK),
    detecting a Mark frequency and a Space frequency for each channel, and determining for each channel a frequency range for Fourier transformation calculation of the plurality of receiving signals, based on the detected Mark frequency and the detected Space frequency;
    performing the Fourier transformation calculation on the determined frequency range for each channel and detecting, for each channel, frequency components of the plurality of receiving signals respectively;
    shifting for each channel a central frequency of the detected frequency components to a predetermined reference frequency; and
    demodulating the shifted frequency components of each channel and extracting demodulation data for each channel,
    wherein a frequency that has a peak value in a reception level among positive frequency components of the plurality of receiving signals is detected as the Mark frequency and another frequency that has a peak value in the reception level among negative frequency components of the plurality of receiving signals is detected as the Space frequency.

4. The demodulation method according to claim 3, further including:
    estimating a demodulation mode for each channel based on the detected Mark frequency and the detected Space frequency.

* * * * *